United States Patent
Ho

(10) Patent No.: US 9,456,432 B2
(45) Date of Patent: *Sep. 27, 2016

(54) CLOCK SYNCHRONIZATION AND CENTRALIZED GUARD TIME PROVISIONING

(71) Applicant: Texas Instruments Incorporated, Dallas, TX (US)

(72) Inventor: Jin-Meng Ho, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/093,322

(22) Filed: Apr. 7, 2016

(65) Prior Publication Data

US 2016/0227499 A1 Aug. 4, 2016

Related U.S. Application Data

(63) Continuation of application No. 13/633,840, filed on Oct. 2, 2012, now Pat. No. 9,338,757.

(60) Provisional application No. 61/542,418, filed on Oct. 3, 2011.

(51) Int. Cl.
*H04W 56/00* (2009.01)

(52) U.S. Cl.
CPC ......... *H04W 56/003* (2013.01); *H04W 56/001* (2013.01)

(58) Field of Classification Search
None
See application file for complete search history.

(56) References Cited

U.S. PATENT DOCUMENTS

| | | | | |
|---|---|---|---|---|
| 7,729,254 B2* | 6/2010 | Hall | ......... | H04L 12/44 370/235 |
| 7,831,002 B2* | 11/2010 | Poberezhskiy | ........ | H04B 1/707 327/141 |
| 8,149,733 B2* | 4/2012 | Basu | ....... | G01D 9/005 370/230 |
| 8,670,435 B2* | 3/2014 | Ho | ..... | H04W 52/0216 370/252 |
| 8,798,029 B2* | 8/2014 | Soliman | ................ | H04W 48/14 370/350 |
| 8,811,372 B2* | 8/2014 | Li | ..... | H04W 56/0015 370/324 |
| 8,943,305 B2* | 1/2015 | Ho | ......... | G06Q 10/06 713/151 |
| 8,964,724 B2* | 2/2015 | Ho | .... | H04W 56/0015 370/324 |
| 8,989,803 B2* | 3/2015 | Chuo | .... | H04W 16/14 370/329 |

(Continued)

*Primary Examiner* — Ayaz Sheikh
*Assistant Examiner* — Faiyazkhan Ghafoerkhan
(74) *Attorney, Agent, or Firm* — Ronald O. Neerings; Frank D. Cimino

(57) ABSTRACT

Embodiments of the invention provide a method to accommodate clock drift and guard time in a centralized fashion. In one embodiment, a device is adapted to communicate. Clocks are synchronized using beacon or/and acknowledgement frames. A centralized guard time is calculated between two neighboring allocation intervals. The centralized guard time accounts for clock drift during a nominal synchronization interval. An interval at least as long as the centralized guard time is provisioned between two neighboring allocation intervals. One or more frames are transmitted within the allocation intervals.

26 Claims, 8 Drawing Sheets

(56) References Cited

U.S. PATENT DOCUMENTS

| | | | | |
|---|---|---|---|---|
| 2006/0050677 A1* | 3/2006 | Schafer | H04B 7/2656 | 370/345 |
| 2006/0215581 A1* | 9/2006 | Castagnoli | H04L 12/2602 | 370/254 |
| 2006/0239333 A1* | 10/2006 | Albert | H04W 72/0406 | 375/130 |
| 2008/0089394 A1* | 4/2008 | Poberezhskiy | H04W 56/0085 | 375/145 |
| 2008/0232344 A1* | 9/2008 | Basu | G01D 9/005 | 370/350 |
| 2008/0240050 A1* | 10/2008 | Pun | H04J 3/0652 | 370/337 |
| 2009/0016320 A1* | 1/2009 | Li | H04W 56/0015 | 370/350 |
| 2009/0207954 A1* | 8/2009 | Dai | H04J 3/0605 | 375/345 |
| 2009/0245224 A1* | 10/2009 | Iyer | H04W 56/003 | 370/345 |
| 2010/0035629 A1* | 2/2010 | Soliman | H04W 48/14 | 455/455 |
| 2010/0195552 A1* | 8/2010 | Ho | H04W 52/0216 | 370/311 |
| 2010/0202354 A1* | 8/2010 | Ho | G06Q 10/06 | 370/328 |
| 2011/0038360 A1* | 2/2011 | Ho | H04J 3/1682 | 370/346 |
| 2011/0176534 A1* | 7/2011 | Subramanian | H04J 3/0685 | 370/350 |
| 2011/0268018 A1* | 11/2011 | Wang | H04W 56/002 | 370/328 |
| 2012/0155279 A1* | 6/2012 | Ho | H04L 47/522 | 370/241 |
| 2013/0083789 A1* | 4/2013 | Ho | H04W 56/0015 | 370/350 |
| 2013/0083790 A1* | 4/2013 | Ho | H04W 56/0015 | 370/350 |

\* cited by examiner

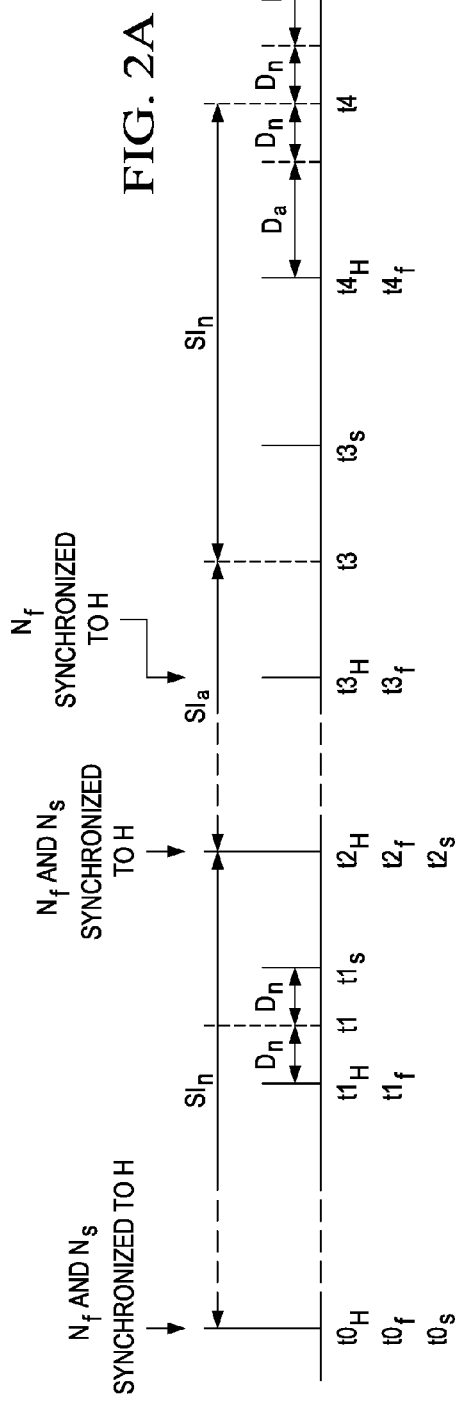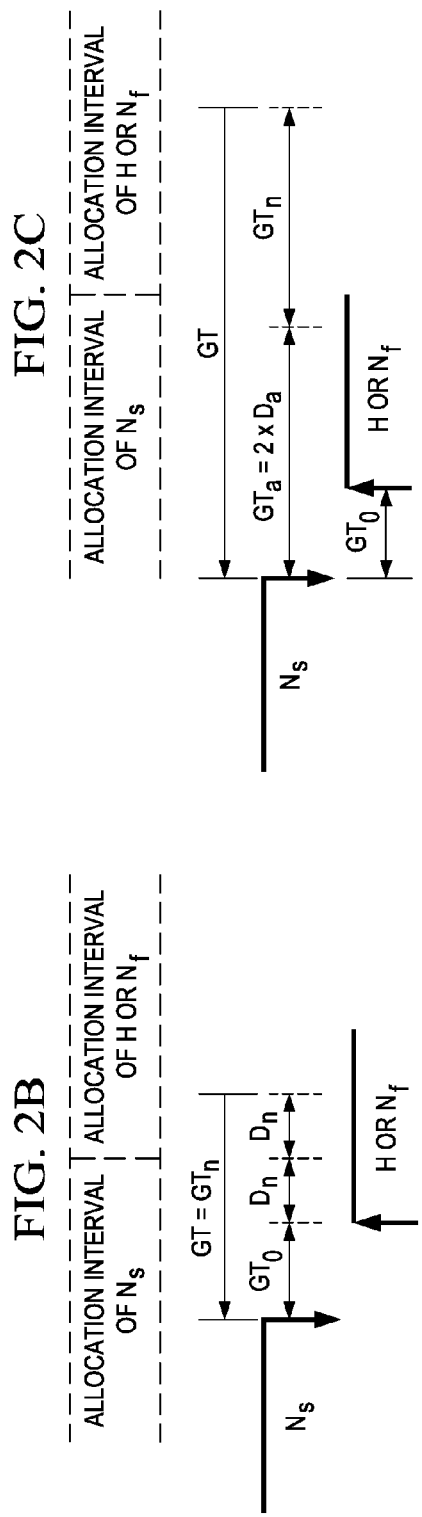

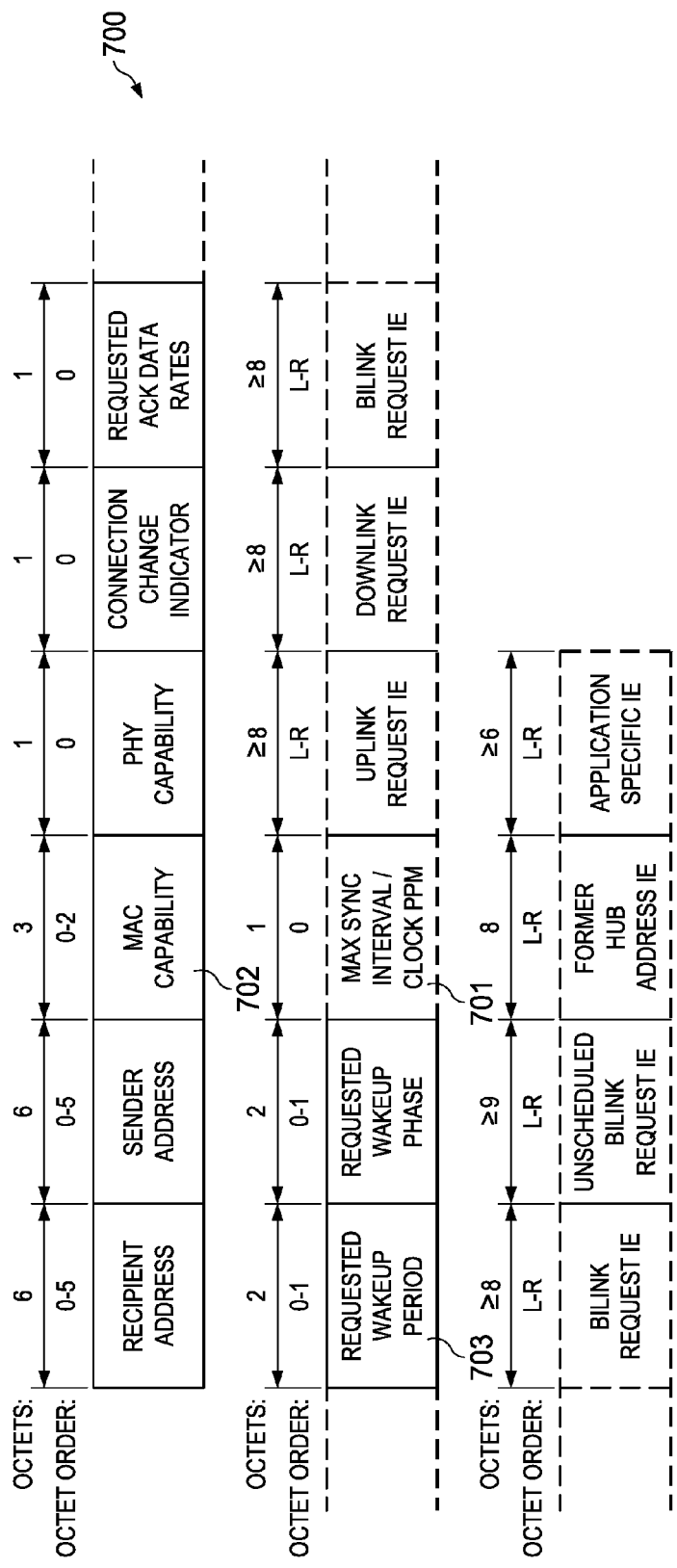
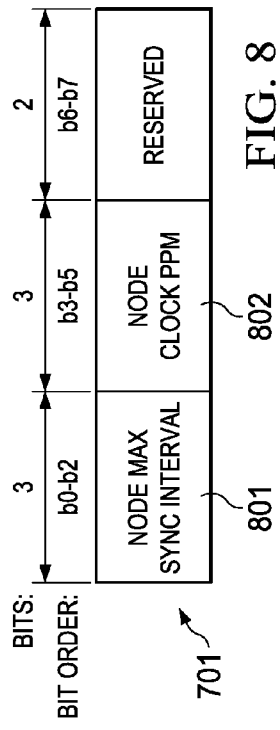
FIG. 7
FIG. 8

CLOCK SYNCHRONIZATION AND CENTRALIZED GUARD TIME PROVISIONING

CROSS-REFERENCE TO RELATED APPLICATIONS

This application is a continuation of a claims benefit of U.S. patent application Ser. No. 13/633,840 filed Oct. 2, 2012, which claims the benefit of the filing date of U.S. Provisional Patent Application No. 61/542,418 for "Clock Drift and Guard Time in Communication Systems," which was filed Oct. 3, 2011, the disclosure of which is hereby incorporated by reference herein in its entirety.

BACKGROUND

Time synchronization is important in wireless sensor networks constituted by multiple interconnected devices, such as a hub or controller node communicating with a plurality of nodes. Each hub or node has its own notion of time based on a local clock. The nodes occasionally synchronize with their respective hub or controller node. Additionally, a hub or controller node may occasionally synchronize to a global and/or coordinated universal time (UTC). However, each hub or node's local clock may run faster or slower than the other device's clock and/or a reference time. Because the hub and nodes refer to their local clock to determine when to transmit, receive, or otherwise act, the devices must compensate for drift errors in local clocks to prevent or reduce overlapping transmissions among the devices.

SUMMARY

In embodiments of the invention, a first device is adapted to communicate with a second device. A clock in the first device is synchronized to a clock in the second device using beacon or/and acknowledgement frames received from the second device. A nominal guard time is computed that accounts for the maximum clock drift in the first and second devices during a nominal synchronization interval. An additional guard time is computed that accounts for the maximum clock drift in the first and second devices during an additional interval beyond the nominal synchronization interval. An available transmission interval is determined within an allocation interval for transmissions between the devices, wherein the beginning and/or the end of the available transmission interval are selected by accounting for the nominal guard time or the additional guard time or both. One or more frames are transmitted between the devices and within the available transmission interval.

In another embodiment, a first device is adapted to communicate with a second device. A clock in the first device is synchronized to a clock in the second device using beacon or/and acknowledgement frames received from the second device. A centralized guard time is calculated by the second device between two neighboring allocation intervals. The centralized guard time accounting for the maximum clock drift in the first and second devices during a nominal synchronization interval. An interval at least as long as the centralized guard time is provisioned by the second device between two neighboring allocation intervals. One or more frames are transmitted between the devices within the allocation intervals.

The distributed method requires nodes to compute and set aside the guard times. The centralized method relies on the hub to do those jobs. Thus, the latter simplifies the node design at the cost of increased hub complexity.

BRIEF DESCRIPTION OF THE DRAWINGS

Figure 1A:
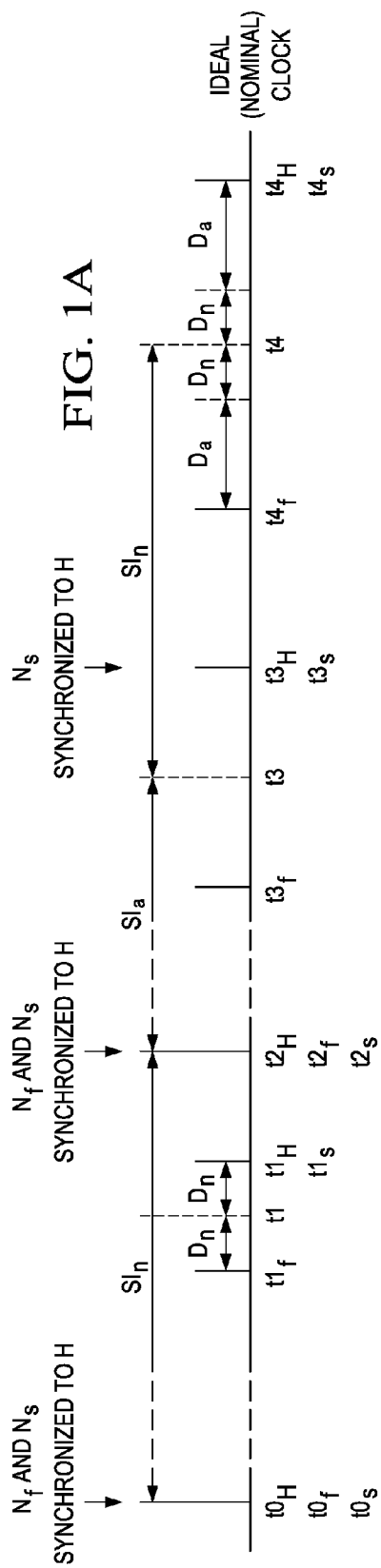
Figure 1B:
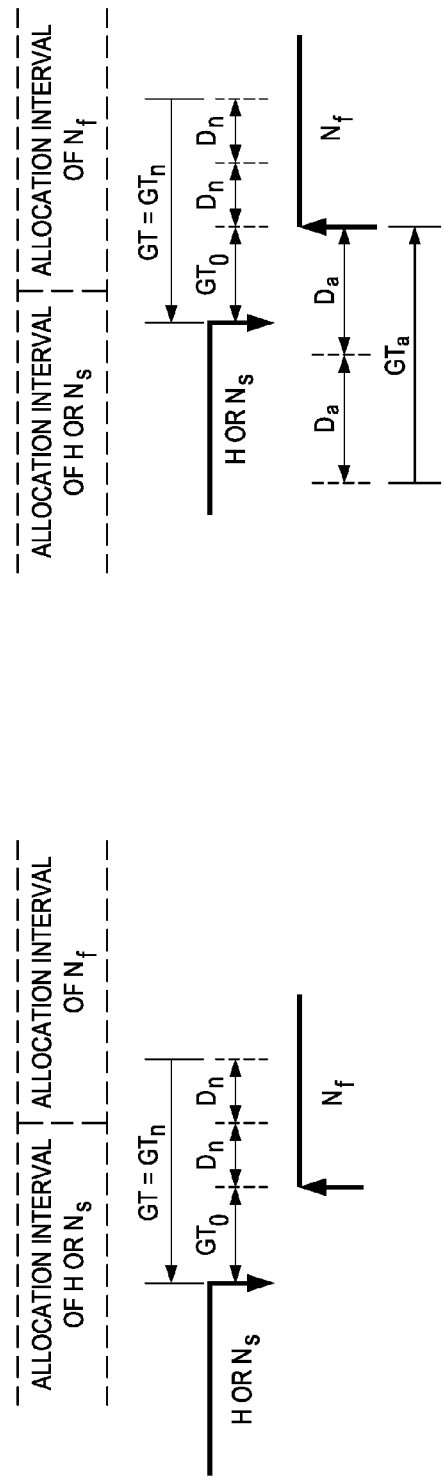
Figure 1C:
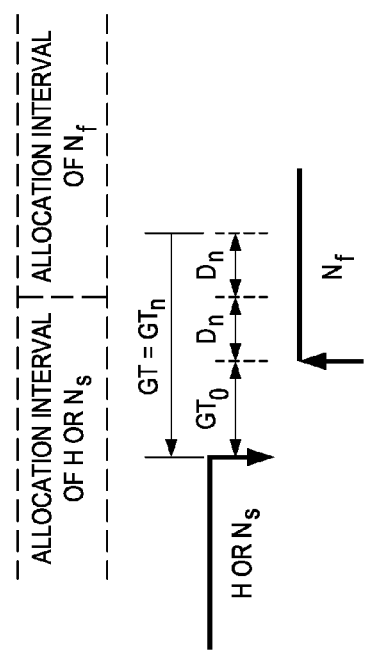

Having thus described the invention in general terms, reference will now be made to the accompanying drawings, wherein:

FIGS. 1A-C illustrate clock drifts and guard times for the case of a hub and nodes operating with the same clock accuracy where the hub clock is slow.

FIGS. 2A-C illustrate clock drifts and guard times for the case of a hub and nodes operating with the same clock accuracy where the hub clock is fast.

Figure 3:
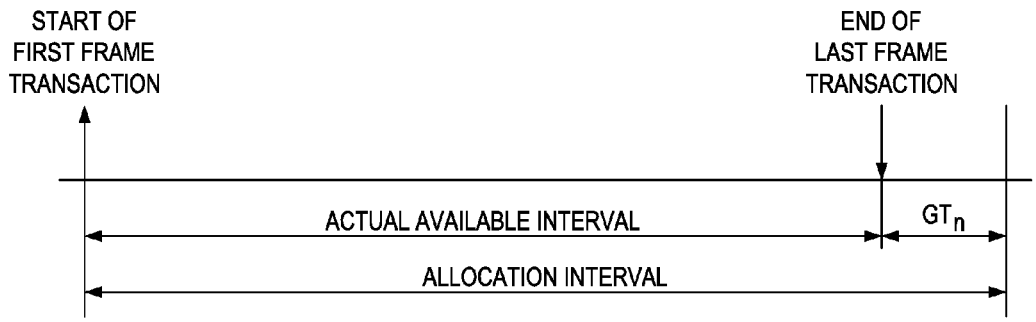

FIG. 3 illustrates distributed provisioning of guard times for frame transmissions for a nominal guard time.

Figure 4:
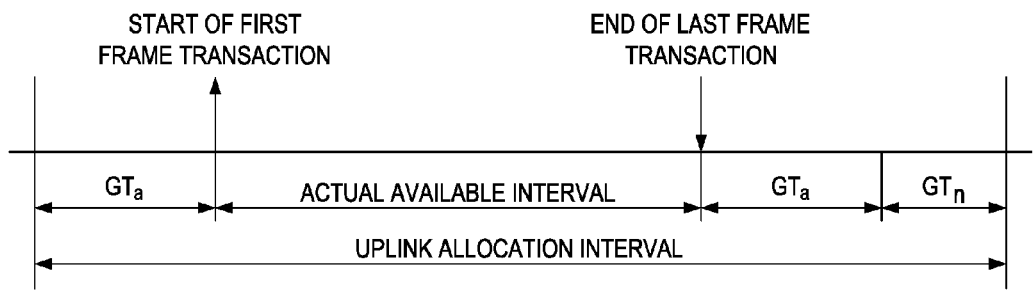

FIG. 4 illustrates distributed provisioning of guard times for frame transmissions for a nominal guard time and an additional guard time.

Figure 5A:
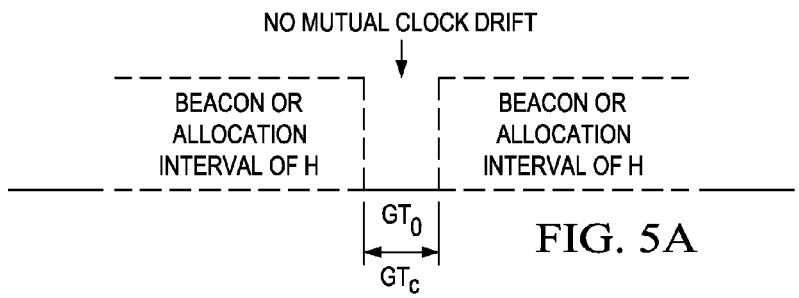

FIG. 5A illustrates a beacon or allocation interval of a hub followed by a beacon or allocation interval of the hub.

Figure 5B:
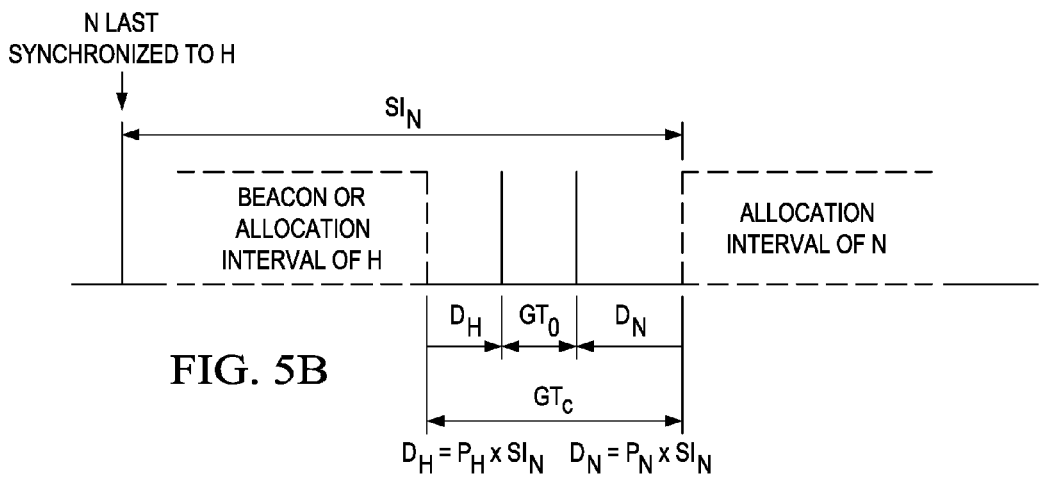

FIG. 5B illustrates a beacon or allocation interval of a hub followed by an allocation interval of a node.

Figure 5C:
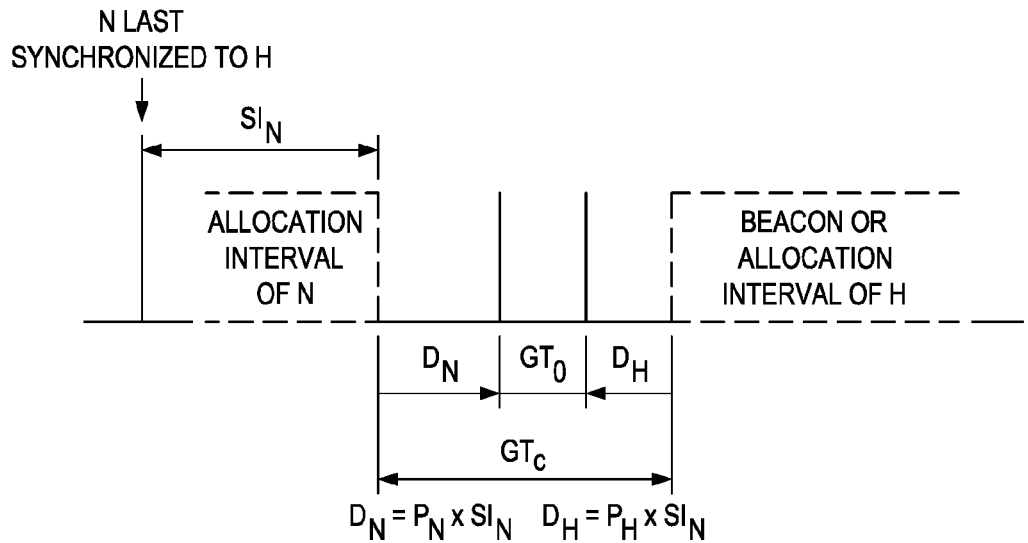

FIG. 5C illustrates an allocation interval of a node followed by a beacon or allocation interval of a hub.

Figure 5D:
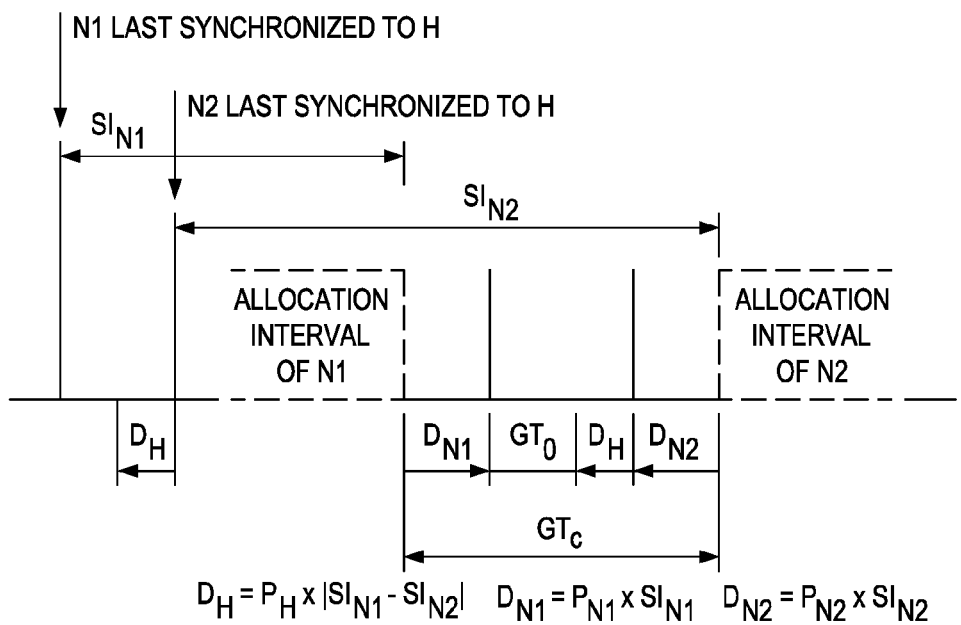

FIG. 5D illustrates an allocation interval of a first node (N1) followed by an allocation interval of a second node (N2) where the first node was synchronized to a hub before the second node.

Figure 5E:
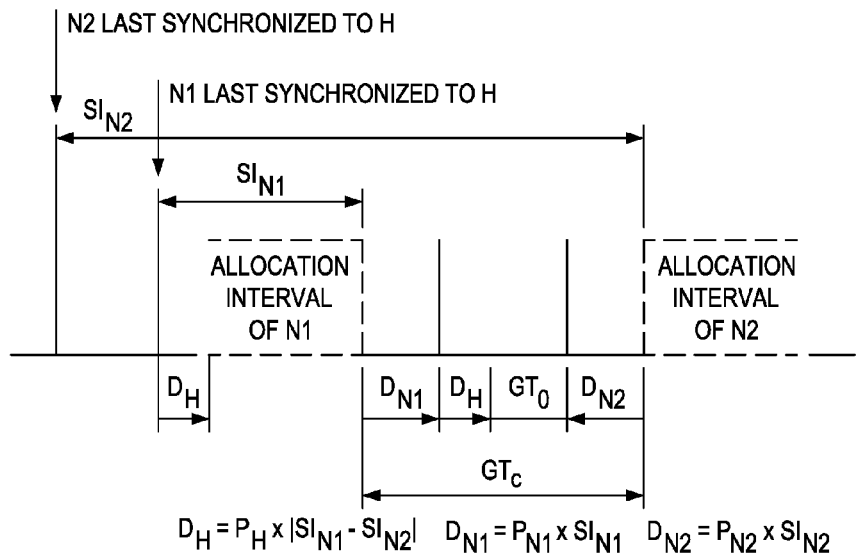

FIG. 5E illustrates an allocation interval of the first node (N1) followed by an allocation interval of the second node (N2) where the second node was synchronized to a hub before the first node.

Figure 6:
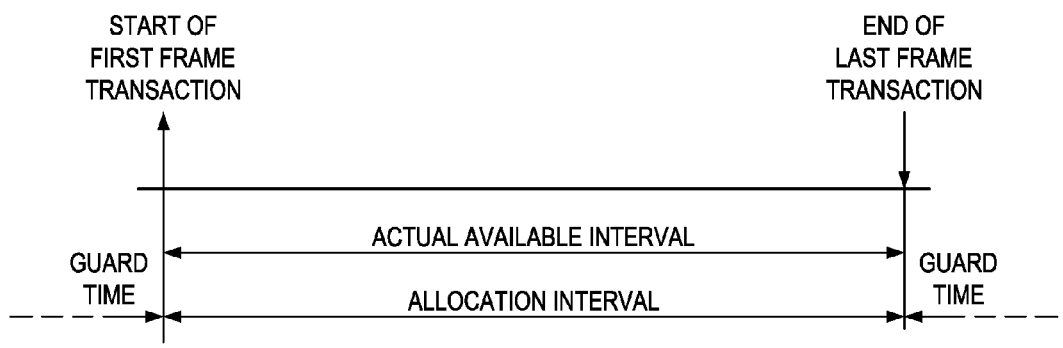

FIG. 6 illustrates centralized provisioning of guard times for frame transmissions.

FIG. 7 illustrates a format of a frame payload format for a Connection Request frame according to one embodiment.

FIG. 8 illustrates a format of a Max Sync Interval/Clock PPM field according to one embodiment.

Figure 9:
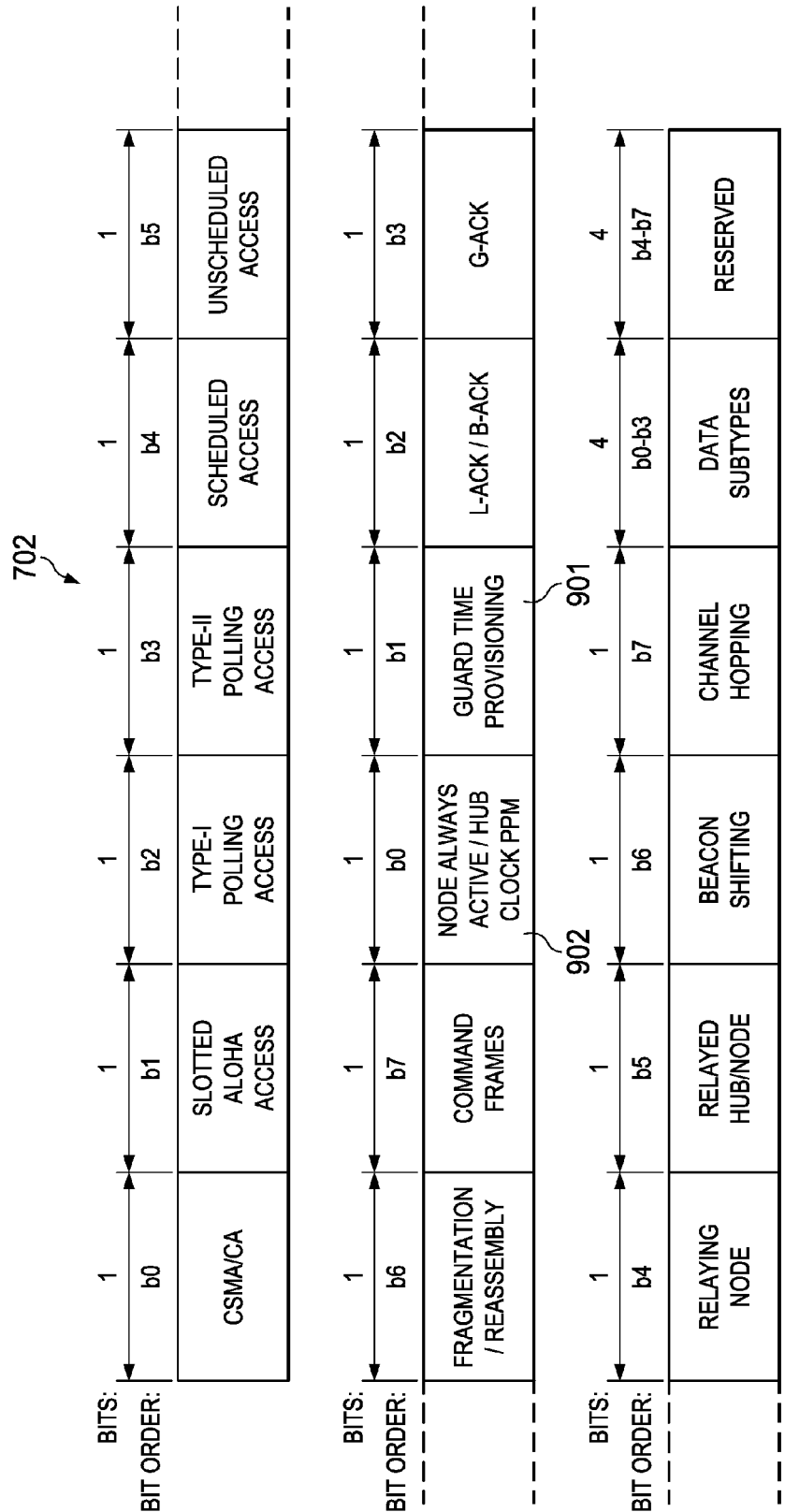

FIG. 9 illustrates a format of a MAC Capability field according to one embodiment.

Figure 10:
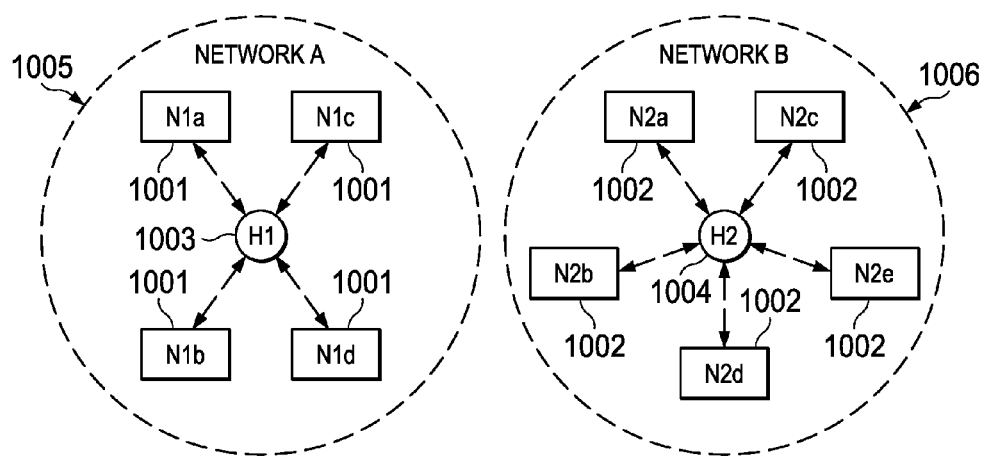

FIG. 10 is a block diagram illustrating a network topology employing embodiments of the invention.

Figure 11:
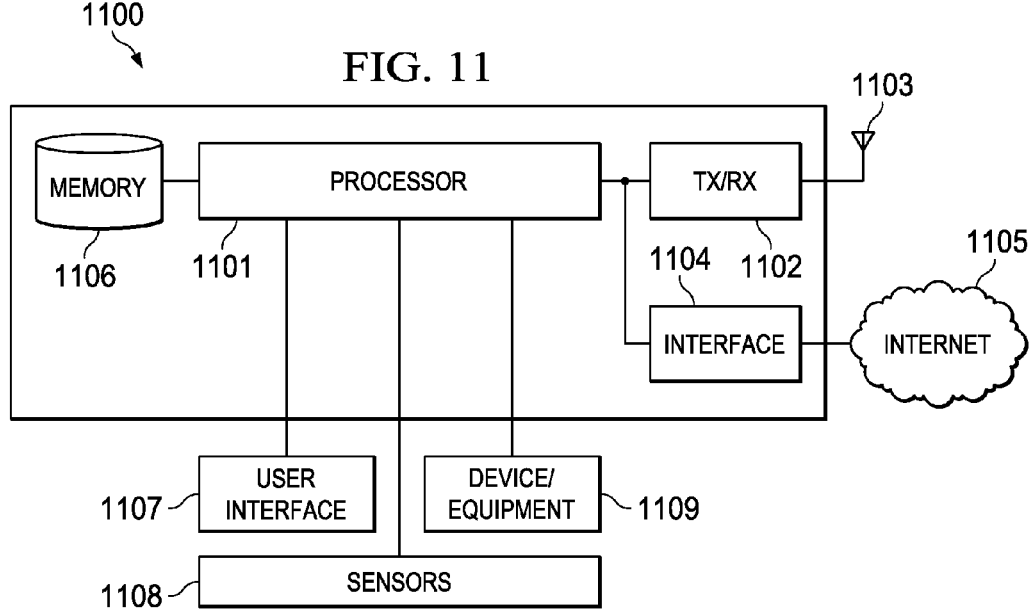

FIG. 11 is a block diagram of an exemplary embodiment of a device implementing embodiments of the invention.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Embodiments of the invention relate to clock synchronization and guard time provisioning.

A node or a hub maintains a MAC clock with a minimum resolution of mClockResolution and with a minimum accuracy of mHubClockPPMLimit to time its frame transmission and reception, except that a node may use a MAC clock with a PPM higher than mHubClockPPMLimit subject to certain restrictions as stated below. The node or the hub times its transmission and reception in any of their allocation intervals according to its local clock.

The node may request the hub to include a timestamp in an acknowledgment frame, such as an I-Ack, B-Ack, I-Ack+Poll, or B-Ack+Poll frame, for example, by setting to one an Ack Timing field of a management or data type frame being sent with an Ack Policy field of the MAC header set to I-Ack or B-Ack. The timestamp encodes a start time of the acknowledgment frame transmission based on the hub's clock. The hub includes such a timestamp in the acknowledgment frame if and only if requested by the node.

The node synchronizes to the hub through beacons, T-Poll frames, acknowledgment frames containing a timestamp, or first frames (on-time frames) in scheduled allocation intervals received from the hub. In particular, the node advances or delays its clock by a total amount as shown in the following equations, respectively:

$$D = T_S - T_L, \text{ if } T_S > T_L \qquad \text{Eq. (1)}$$

$$D = T_L - T_S, \text{ if } T_S < T_L \qquad \text{Eq. (2)}$$

where $T_S$ is the time when such a frame started to be transmitted on the transport medium (i.e., air), and $T_L$ is the time when the frame started to be received according to the local clock.

A node may rely on itself or a hub to track and set aside appropriate guard times in its allocation intervals.

A hub shall be ready to accommodate either choice, referred to as distributed or centralized guard time provisioning, respectively, as indicated in the node's last transmitted MAC Capability field.

Distributed Guard Time Provisioning.

For distributed guard time provisioning, a node and a hub include appropriate guard times in the scheduled allocation intervals that they requested or assigned, respectively. The hub also includes appropriate guard times in the polled allocation intervals that are granted to the node.

Distributed Guard Time Computation.

If the node and the hub have the same clock accuracy, the node and the hub compute a nominal guard time ($GT_n$) to compensate for their respective maximum clock drifts over an interval, which is not longer than a nominal synchronization interval ($SI_n$). The clock accuracy of the hub in terms of PPM is designated herein as HubClockPPM. Equations (3)-(6) may be used to calculate the nominal guard time ($GT_n$):

$$GT_n = GT_0 + 2 \times D_n \qquad \text{Eq. (3)}$$

$$GT_0 = pSIFS + pExtraIFS + mClockResolution \qquad \text{Eq. (4)}$$

$$D_n = SI_n \times HubClockPPM \qquad \text{Eq. (5)}$$

$$SI_n = mNominalSynchInterval \qquad \text{Eq. (6)}$$

The parameter $GT_0$ comprises the receive-to-transmit or transmit-to-receive turnaround time (pSIFS), the synchronization error tolerance (pExtraIFS), and the timing uncertainty (mClockResolution), which are all fixed values that are independent of clock drifts.

The parameter $D_n$ represents the maximum clock drift of the node or the hub relative to an ideal or nominal clock over the synchronization interval, $SI_n$. The $SI_n$ parameter delimits a nominal synchronization interval over which the clock drifts of the node and the hub are accounted for in the nominal guard time $GT_n$.

The node further computes an additional guard time ($GT_a$) to compensate for additional clock drifts of itself and the hub over an interval $SI_a$ beyond $SI_n$. $GT_a$ can be calculated as shown in Equation (7).

$$GT_a = 2 \times D_a \qquad \text{Eq. (7)}$$

where, $$D_a = SI_a \times HubClockPPM \qquad \text{Eq. (8)}$$

The parameter $SI_a$ denotes the length of the time interval that has accrued in addition to $SI_n$ since the node's last synchronization with the hub. The corresponding additional clock drift $D_a$ is a function of $SI_a$ and accounts for the required additional guard time $GT_a$. The values of $D_a$ and $SI_a$ are specific to the node and time of concern.

A node may time its frame transmission and reception with a clock accuracy, NodeClockPPM, that is larger than the hub's clock accuracy, HubClockPPM, provided the node reduces its nominal synchronization interval to $SI_n$ as shown in Equation (9).

$$SI_n \times NodeClockPPM = mNominalSynchInterval \times HubClockPPM \qquad \text{Eq. (9)}$$

If the time interval length (SI) since the node's last synchronization with the hub exceeds the reduced $SI_n$ by $SI_a$, —that is, if $SI = SI_n + SI_a$—then, the node calculates the required additional guard time $GT_a$ as shown in Equation (10):

$$GT_a = SI_a \times NodeClockPPM + \min[0, (SI - mNominalSynchInterval) \times HubClockPPM] \qquad \text{Eq. (10)}$$

FIGS. 1A-C and 2A-C illustrate clock drifts and guard times for the case of a hub and nodes operating with the same clock accuracy. A slow hub is illustrated in FIGS. 1A-C. A fast hub is illustrated in FIGS. 2A-C.

The following legend applies to the figures.
Nf=fast node
Ns=slow node
H=hub
$tm_H$=position of ideal or nominal clock when the hub's local clock is at tm,
  where m=1, 2, 3, or 4
$tm_f$=position of ideal or nominal clock when the fast node's local clock is at tm
$tm_s$=position of ideal or nominal clock when the slow node's local clock is at tm
$SI_n$=nominal synchronization interval
$GT_n$=nominal guard time
$D_n$=maximum clock drift over $SI_n$ relative to ideal clock
$SI_a$=additional synchronization interval
$GT_a$=additional guard time
$D_a$=maximum clock drift over $SI_a$ relative to ideal clock
allocation interval of H=allocation interval in which H controls the timing for frame transactions
allocation interval of N=allocation interval in which N controls the timing for frame transactions.

FIG. 3 illustrates the distributed provisioning of guard times for frame transmissions for a nominal guard time.

FIG. 4 illustrates the distributed provisioning of guard times for frame transmissions for a nominal guard time and an additional guard time.

Distributed Guard Time Compensation.

With reference to FIGS. 1A-C, 2A-C, 3, and 4, and with $GT_n$ given in Equation (3), $GT_0$ in Equation (4), $SI_n$ in Equation (6) or Equation (9) as appropriate, and $GT_a$ in Equation (10), the node and the hub account for clock drifts and guard times in their frame transmission and reception as follows.

The hub commences its beacon transmission at the nominal start of the beacon.

The hub commences its transmission in the node's next scheduled downlink or bilink allocation interval at the nominal start of the interval and ends its transmission in the interval early enough such that the last transmission in the interval completes at least $GT_n$ prior to the nominal end of the interval.

The hub commences its transmission of the node's next future poll or post at the nominal start of the poll or post.

The hub commences its reception in the node's next scheduled uplink allocation interval up to $GT_n - GT_0$ earlier than the nominal start of the interval to account for pertinent clock drifts.

If the node's last synchronization to the hub was less than $SI_n$ ago at the nominal end of its next scheduled uplink or polled allocation interval, the node commences its transmission in the interval at the nominal start of the interval, and the node ends its transmission in the interval early enough such that the last transmission in the interval completes at least $GT_n$ prior to the nominal end of the interval.

If the node's last synchronization to the hub was less than $SI_n$ ago at the nominal start of the next beacon transmission, the node commences its reception of the beacon up to $GT_n - GT_0$ earlier than the nominal start of the beacon to account for pertinent clock drifts.

If the node's last synchronization to the hub was less than $SI_n$ ago at the nominal start of its next future poll or post, the node commences its reception of the poll or post up to $GT_n - GT_0$ earlier than the nominal start of the poll or post to account for pertinent clock drifts.

If the node's last synchronization to the hub was less than $SI_n$ ago at the nominal start of its next scheduled downlink or bilink allocation interval, the node commences its reception in the interval up to $GT_n - GT_0$ earlier than the nominal start of the interval to account for pertinent clock drifts. The node may commence its reception up to $GT_n - GT_0$ later than the start of the interval based on its estimate of the relative clock drift with respect to the hub since its last synchronization with the hub.

If the node's last synchronization to the hub was $SI_n + SI_a$ ago at the nominal end of its next scheduled uplink allocation interval, the node commences its transmission in the interval $GT_a$ later than the nominal start of the interval, and ends its transmission in the interval early enough such that the last transmission in the interval completes at least $GT_n + GT_a$ prior to the nominal end of the interval.

If the node's last synchronization to the hub was $SI_n + SI_a$ ago at the nominal end of its next polled allocation interval, the node commences its transmission in the interval at the nominal start of the interval, and ends its transmission in the interval early enough such that the last transmission in the interval completes at least $GT_n + GT_a$ prior to the nominal end of the interval.

If the node's last synchronization to the hub was less than $SI_n + SI_a$ ago at the nominal start of the next beacon transmission, the node commences its reception of the beacon up to $GT_n + GT_a - GT_0$ earlier than the nominal start of the beacon to account for pertinent clock drifts.

If the node's last synchronization to the hub was less than $SI_n + SI_a$ ago at the nominal start of its next future poll or post, the node commences its reception of the poll or post up to $GT_n + GT_a - GT_0$ earlier than the nominal start of the poll or post to account for pertinent clock drifts.

If the node's last synchronization to the hub was $SI_n + SI_a$ ago at the nominal start of its next scheduled downlink or bilink allocation interval, the node commences its reception in the interval up to $GT_n + GT_a - GT_0$ earlier than the nominal start of the interval to account for pertinent clock drifts. The node may commence its reception up to $GT_n + GT_a - GT_0$ later than the start of the interval based on its estimate of the relative clock drift with respect to the hub since its last synchronization with the hub.

Distributed Guard Time Allocation.

The node and the hub include a nominal guard time $GT_n$ as given in Equation (3) and, if applicable, twice an additional guard time $GT_a$ as given in Equation (10) in each of the scheduled allocation intervals they request or assign. The hub also includes the nominal guard time GTn in each of the polled allocation intervals granted to the node.

Clock synchronization for distributed guard time provisioning.

The node synchronizes with the hub at least once within the nominal synchronization interval $SI_n$ given in Equation (6) or Equation (9) as appropriate, if only the nominal guard time $GT_n$ as given in Equation (3) is accounted for per distributed guard time allocation. The node synchronizes with the hub at least once within the nominal synchronization interval $SI_n$ given in Equation (6) or Equation (9) as appropriate, plus the additional synchronization interval $SI_a$ given in Equation (9), if both the nominal guard time $GT_n$ as given in Equation (3) and the additional guard time $GT_a$ as given in Equation (10) are accounted for per distributed guard time allocation.

Centralized Guard Time Provisioning.

For centralized guard time provisioning, the node does not include clock drifts or guard times in the scheduled allocation intervals it requests, but the hub includes appropriate clock drifts in the downlink or bilink scheduled allocation intervals it assigns to the node. The hub also provisions an appropriate guard time between two neighboring allocation intervals one or both of which are assigned to the node requiring centralized guard time provisioning.

Centralized Guard Time Computation.

An illustration of clock drifts and guard times for the case of neighboring allocation intervals—with a beacon treated as an allocation interval—not including guard times is given in FIGS. 5A-E, with the following legend (PPM denotes parts-per-million).

H=hub
N=node
N1=node 1
N2=node 2
$P_H$=PPM of H's clock
$P_N$=PPM of N's clock
$P_{N1}$=PPM of N1's clock
$P_{N2}$=PPM of N2's clock
$SI_N$=maximum synchronization interval of N
$SI_{N1}$=maximum synchronization interval of N1
$SI_{N2}$=maximum synchronization interval of N2
$D_H$=clock drift of H relative to ideal clock
$D_N$=clock drift of N relative to ideal clock
$D_{N1}$=clock drift of N1 relative to ideal clock
$D_{N2}$=clock drift of N2 relative to ideal clock
$GT_c$=centralized guard time
allocation interval of H=allocation interval in which H controls the timing for frame transactions
allocation interval of N=allocation interval in which N controls the timing for frame transactions.

FIGS. 5A-E provide an analysis of clock drifts and guard times for centralized provisioning. FIG. 5A illustrates a beacon or allocation interval of a hub followed by a beacon or allocation interval of the hub. FIG. 5B illustrates a beacon or allocation interval of a hub followed by an allocation interval of a node. FIG. 5C illustrates an allocation interval of a node followed by a beacon or allocation interval of a hub. FIG. 5D illustrates an allocation interval of a first node (N1) followed by an allocation interval of a second node (N2) where the first node was synchronized to the hub before the second node. FIG. 5E illustrates an allocation interval of the first node (N1) followed by an allocation interval of the second node (N2) where the second node was synchronized to the hub before the first node.

As shown in FIGS. 5A-E, the hub computes a centralized guard time ($GT_c$) between two neighboring allocation intervals, neither of which includes a guard time, to compensate for pertinent clock drifts as described below. A beacon is treated as an allocation interval.

In FIG. 5A, each of the allocation intervals is a beacon or an allocation interval in which the hub controls the timing for frame transactions. The centralized guard time is calculated as shown in Equation (11):

$$GT_c = GT_0 \qquad \text{Eq. (11)}$$

In FIGS. 5B and 5C, one of the two allocation intervals is a beacon or an allocation interval in which the hub controls the timing for frame transactions, and the other is an allocation interval in which the node controls the timing for frame transactions. Given the node's maximum synchronization interval $SI_N$ and its clock accuracy $P_N$ in terms of PPM, and the hub's clock accuracy $P_H$ in terms of PPM, the centralized guard time is calculated as shown in Equation (12):

$$GT_c = GT_0 + SI_N \times (P_H + P_N) \qquad \text{Eq. (12)}$$

In FIGS. 5D and 5E, one of the two allocation intervals is an allocation interval in which a first node (N1) controls the timing for frame transactions, and in the other allocation interval a second node (N2) controls the timing for frame transactions. Given the first node's maximum synchronization interval $SI_{N1}$ and its clock accuracy $P_{N1}$ in terms of PPM, the second node's maximum synchronization interval $SI_{N2}$ and its clock accuracy $P_{N2}$ in terms of PPM, and the hub's clock accuracy $P_H$ in terms of PPM, with the second node also requiring centralized guard time provisioning, the centralized guard time is calculated as shown in Equation (13):

$$GT_c = GT_0 + P_{N1} \times SI_{N1} + P_{N2} \times SI_{N2} + PH \times |SI_{N1} - SI_{N2}| \qquad \text{Eq. (13)}$$

The parameter $GT_0$ is a fixed value independent of clock drifts as given in Equation (4).

In FIG. 5A, there are no relative clock drifts since it is the same hub that controls the timing for frame transactions in both allocation intervals. In FIGS. 5B and 5C, since the node last synchronized to the hub at time $SI_N$ ago, the hub's clock has drifted by $D_H$ toward the other allocation interval, and the node's clock has drifted by $D_N$ toward the other direction, both relative to an ideal clock. In FIGS. 5D and 5E, since the two nodes last synchronized to the hub at times $SI_{N1}$ and $SI_{N2}$ ago, the nodes' clocks have drifted by $D_{N1}$ and $D_{N2}$ in opposite directions, respectively. Between the times of the nodes' last synchronization, the hub's clock has also drifted by $D_H$ in the same direction as the clock of the node that synchronized with the hub later, all relative to an ideal clock.

Of the two neighboring allocation intervals, in case the earlier one is provided for distributed guard time provisioning and thus includes a nominal guard time $GT_n$ as given in Equation (3) at the end, the hub may deduct $GT_n$ from $GT_c$ in inserting a centralized guard time between the two intervals. Further, if the earlier one is a scheduled uplink or polled allocation interval provided to a node for distributed guard time provisioning, the hub sets $SI_N$ or $SI_{N1}$ to $SI_n$ as given in Equation (6) in computing $GT_c$ according to Equation (12) or Equation (13).

On the other hand, in case the later one is a scheduled downlink, bilink, or uplink allocation interval assigned to a node requiring distributed guard time provisioning, the hub treats such an interval as one assigned for centralized guard time provisioning in inserting a centralized guard time between the two intervals. Further, if such an interval is a scheduled uplink allocation interval, the hub sets $SI_N$ or $SI_{N2}$ to $SI_n$ as given in Equation (6) in computing $GT_c$ according to Equation (12) or Equation (13), respectively.

Centralized Guard Time Compensation.

FIG. 6 illustrates centralized provisioning of guard times for frame transmissions.

With reference to FIGS. 5A-E and FIG. 6, and with $GT_0$ given in Equation (4), and $GT_c$ in Equation (11), Equation (12), or Equation (13) as appropriate, the node and the hub account for clock drifts in their frame transmission and reception as follows, where the node applies Equation (12) to calculate $GT_c$ for its reception time.

The hub commences its beacon transmission at the nominal start of the beacon.

The hub commences its transmission in the node's next scheduled downlink or bilink allocation interval at the nominal start of the interval, and ends its transmission in the interval early enough such that the last transmission in the interval completes by the nominal end of the interval.

The hub commences its transmission of the node's next future poll or post at the nominal start of the poll or post.

The hub commences its reception in the node's next scheduled uplink allocation interval up to $GT_c - GT_0$ earlier than the nominal start of the interval to account for pertinent clock drifts since the node last synchronized with it.

The node commences its transmission in a scheduled uplink allocation interval at the nominal start of the interval, and ends its transmission in the interval early enough such that the last transmission in the interval completes by the nominal end of the interval.

The node commences its reception of the beacon up to $GT_c - GT_0$ earlier than the nominal start of the beacon to account for pertinent clock drifts since it last synchronized with the hub.

The node commences its reception in its next scheduled downlink or bilink allocation interval up to $GT_c - GT_0$ earlier or later than the nominal start of the interval to account for pertinent clock drifts since it last synchronized with the hub.

The node commences its reception of its next poll or post up to $GT_c - GT_0$ earlier than the nominal start of the poll or post to account for pertinent clock drifts, where the node's last synchronization interval is measured up to the nominal start of the poll or post.

Centralized Guard Time Allocation.

The node does not include clock drifts or guard times in the scheduled allocation intervals it requests. The hub includes $2 \times (GT_c - GT_0)$ with $GT_c$ given in Equation (12) in each of the scheduled downlink or bilink allocation intervals it assigns to the node. The hub also provisions at least a centralized guard time $GT_c$ given in Equation (11), Equation (12), or Equation (13) as appropriate, between two neighboring allocation intervals, minus a nominal guard time $GT_n$ given in Equation (3) if the earlier one of the allocation intervals is provided to a node requiring distributed guard time provisioning and hence includes $GT_n$ in the end, treating a beacon as an allocation interval that does not include $GT_0$.

Clock Synchronization for Centralized Guard Time Provisioning

The node synchronizes with the hub at least once within its maximum synchronization interval $SI_N$ as indicated in its last transmitted Connection Request frame.

FIG. 7 illustrates a format of a frame payload 700 for a Connection Request frame according to one embodiment. A Connection Request frame containing a frame payload formatted as shown in FIG. 7 is transmitted by a node to request creation or modification of a connection with a hub. The Connection Request frame payload includes a Max Sync Interval/Clock PPM field 701, a MAC Capability field 702, and a Requested Wakeup Period field 703 among others.

FIG. 8 illustrates a format of a Max Sync Interval/Clock PPM field 701 according to one embodiment. The Max Sync Interval/Clock PPM field 701 is present only if the node is requiring centralized guard time provisioning as indicated in a MAC Capability field 702 of the Connection Request frame.

Node Max Sync Interval field 801 is set to the length of the node's maximum synchronization interval over which this node is to synchronize with its hub at least once. The Node Max Sync Interval is set in units of a Requested Wakeup Period field 703 value in the Connection Request frame. The Node Max Sync Interval is set to zero to encode a value of 7 such units in one embodiment.

Node Clock PPM field 802 is set to the PPM of the node's MAC clock, which may be encoded according to Table 1 in one embodiment.

TABLE 1

| Field value in decimal | Clock accuracy (ppm) |
|---|---|
| 0 | 20 |
| 1 | 40 |
| 2 | 50 |
| 3 | 100 |
| 4 | 200 |
| 5 | 300 |
| 6 | 400 |
| 7 | 500 |

FIG. 9 illustrates a format of a MAC Capability field 702 according to one embodiment. MAC Capability field 702 includes a Guard Time Provisioning parameter 901. In one embodiment, the Guard Time Provisioning field 901 may be set as follows:

a) In frames sent by a node,
Guard Time Provisioning field 901 is set to one if the node supports and requires centralized guard time provisioning, or
Guard Time Provisioning field 901 is set to zero if the node supports and requires distributed guard time provisioning.

b) In frames sent by a hub, Guard Time Provisioning field 901 is reserved.

MAC Capability field 702 also includes a Node Always Active/Hub Clock PPM parameter 902. The Node Always Active/Hub Clock PPM field 902 may be set as follows in one embodiment:

a) In frames sent by a node, the Node Always Active/Hub Clock PPM field 902 is used as a Node Always Active field, which is set to one if the node will be always in active state ("always active") ready to receive and transmit frames during time intervals wherein polls and posts are allowed to be sent, or is set to zero if the node will not be always in active state.

b) In frames sent by a hub, the Node Always Active/Hub Clock PPM field 902 is used as a Hub Clock PPM field, which is set to one if the hub has a clock with a minimum accuracy of ppm=mHubClockPPMLimit/2, or is set to zero if the hub has a clock with a minimum accuracy of ppm=mHubClockPPMLimit.

FIG. 10 is a block diagram illustrating a network topology employing embodiments of the invention. Nodes 1001, 1002 and hubs 1003, 1004 are organized into logical sets, referred to as networks. In the illustrated embodiment, there is only one hub in a network, but the number of nodes in a network may vary. For example, network A 1005 comprises hub 1003 and a plurality of nodes 1001, and network B 1006 comprises hub 1004 and a plurality of nodes 1002. In one embodiment, data is exchanged within the same network using clock synchronization and guard time provisioning as described herein. The hubs 1003, 1004 and respective nodes 1001, 1002 may communicate using a synchronization interval and guard times negotiated during connection setup.

FIG. 11 is a block diagram of an exemplary embodiment of a device 1100 implementing embodiments of the invention. Device 1100 may be used as a node 1001, 1002 and/or a hub 1003, 1004 in FIG. 10. In one embodiment, device 1100 is a hub, gateway, or controller controlling and communicating with one or more nodes or with other hubs using clock synchronization and guard time provisioning. In another embodiment, device 1100 is a node operating on, in, or around a human or non-human body and communicating with a hub or another node to service one or more applications, such as medical services, consumer electronics, and personal entertainment.

Processor 1101 processes data exchanged with other nodes or hubs via transceiver 1102 and antenna 1103 and/or via wired interface 1104 coupled to Internet or another network 1105. Processor 1101 may be a software, firmware, or hardware based device or a combination thereof. Processor 1101 may also generate and process messages sent to, and received from, another device, such as using clock synchronization and guard time provisioning as described herein.

Memory 1106 may be used to store data packets, synchronization intervals, guard times, and/or other parameters. Memory 1106 may also be used to store computer program instructions, software and firmware used by processor 1101. It will be understood that memory 1106 may be any applicable storage device, such as a fixed or removable RAM, ROM, flash memory, or disc drive that is separate from or integral to processor 1101.

Device 1100 may be coupled to other devices, such as user interface 1107, sensors 1108, or other devices or equipment 1109. Device 1100 may be adapted to operate in a body area network (BAN) either as a node or as a hub controlling a plurality of nodes and coordinating with other hubs for coexistence. Sensors 1108 may be used, for example, to monitor vital patient data, such as body temperature, heart rate, and respiration. Equipment 1109 may be, for example, a monitor or other device that receives and analyzes signals, such as a patient's temperature, heart rate, and respiration, from another node. Alternatively, equipment 1109 may be a device for providing a service to a patient, such as controlling an intravenous drip, respirator, or pacemaker.

It will be understood that the networks 1005, 1006 in FIG. 10 and the device 1100 in FIG. 11 are presented for illustrative purposes only and are not intended to limit the scope of the systems or devices that are capable of employing clock synchronization and guard time provisioning described herein.

Many of the functions described herein may be implemented in hardware, software, and/or firmware, and/or any combination thereof. When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

The software code segments may be stored in any volatile or non-volatile storage device, such as a hard drive, flash memory, solid state memory, optical disk, CD, DVD, computer program product, or other memory device, that provides computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method in network of devices with clocks synchronized using beacon or/and acknowledgement frames, comprising:
    computing a centralized guard time ($GT_c$) by a first device between two neighboring allocation intervals or between a beacon transmission interval and a neighboring allocation interval, the centralized guard time accounting for a maximum clock drift during a nominal synchronization interval;
    computing a minimum guard time ($GT_0$) by the first device, the minimum guard time accounting for a receive-to-transmit or transmit-to-receive turnaround time and a synchronization error tolerance;
    provisioning a guard time interval by the first device between two neighboring allocation intervals or between a beacon transmission interval and a neighboring allocation interval, the guard time interval being at least as long as the centralized guard time; and
    transmitting one or more frames within the allocation intervals.

2. The method of claim 1, wherein the minimum guard time additionally accounts for a timing uncertainty.

3. The method of claim 2, further comprising: commencing transmission by the first device at a nominal start of an at least second device's next scheduled downlink or bilink allocation interval, and ending transmission in the second device's next scheduled downlink or bilink allocation interval such that a last transmission in the second device's next scheduled downlink or bilink allocation interval completes by a nominal end of the interval.

4. The method of claim 2, further comprising:
    commencing reception by the first device up to $GT_c$–$GT_0$ earlier than a nominal start of an at least second device's next scheduled uplink allocation interval to account for clock drifts.

5. The method of claim 2, further comprising:
    computing the minimum guard time ($GT_0$) by summing up a receive-to-transmit or transmit-to-receive turnaround time, a synchronization error tolerance, and a timing uncertainty.

6. The method of claim 1, further comprising: commencing transmission by the first device at a nominal start of an at least second device's next scheduled downlink or bilink allocation interval, and ending transmission in the second device's next scheduled downlink or bilink allocation interval such that a last transmission in the second device's next scheduled downlink or bilink allocation interval completes by a nominal end of the interval.

7. The method of claim 6, further comprising: commencing reception of a beacon by the second device up to $GT_c$–$GT_0$ earlier than a nominal start of the beacon to account for clock drifts since a last synchronization.

8. The method of claim 6, further comprising: commencing reception by the second device up to $GT_c$–$GT_0$ earlier or later than a nominal start of the second device's next scheduled downlink or bilink allocation interval to account for clock drifts since a last synchronization.

9. The method of claim 6, further comprising: commencing reception by the second device up to $GT_c$–$GT_0$ earlier than a nominal start of the second device's next poll or post to account for clock drift, where a last synchronization interval is measured up to the nominal start of the poll or post.

10. The method of claim 1, further comprising:
    commencing reception by the first device up to $GT_c$–$GT_0$ earlier than a nominal start of an at least second device's next scheduled uplink allocation interval to account for clock drifts.

11. A device, comprising: a synchronized clock which is synchronized using received beacon or/and acknowledgement frames; a circuit for sending signals and receiving signals; and a processor adapted to perform operations on the signals sent or received, the processor operating to: compute a centralized guard time (GTe) by the device between two neighboring allocation intervals or between a beacon transmission interval and a neighboring allocation interval, the centralized guard time accounting for clock drift during a nominal synchronization interval; compute a minimum guard time (GTo) by the device, the minimum guard time accounting for a receive-to-transmit or transmit-to-receive turnaround time, and a synchronization error tolerance; provision a guard time interval by the device between two neighboring allocation intervals or between a beacon transmission interval and a neighboring allocation interval, the guard time interval being at least as long as the centralized guard time; and transmit one or more frames between the devices within the allocation intervals.

12. The device of claim 11, wherein the minimum guard time further accounts for a timing uncertainty.

13. The device of claim 12, the processor further operating to: commence transmission by the device at a nominal start of an at least second device's next scheduled downlink or bilink allocation interval, and ending transmission in the second device's next scheduled downlink or bilink allocation interval such that a last transmission in the second device's next scheduled downlink or bilink allocation interval completes by a nominal end of the second device's next scheduled downlink or bilink allocation interval.

14. The device of claim 12, the processor further operating to:
commence reception by the device up to $GT_c-GT_0$ earlier than a nominal start of an at least second device's next scheduled uplink allocation interval to account for clock drifts.

15. The device of claim 11, the processor further operating to: commence transmission by the device at a nominal start of an at least second device's next scheduled downlink or bilink allocation interval, and ending transmission in the second device's next scheduled downlink or bilink allocation interval such that a last transmission in the second device's next scheduled downlink or bilink allocation interval completes by a nominal end of the second device's next scheduled downlink or bilink allocation interval.

16. The device of claim 11, the processor further operating to:
commence reception by the device up to $GT_c-GT_0$ earlier than a nominal start of an at least second device's next scheduled uplink allocation interval to account for clock drifts.

17. A device, comprising: a synchronized clock which is synchronized using received beacon or/and acknowledgement frames; a circuit for sending signals and receiving signals; and a processor adapted to perform operations on the signals sent or received, the processor operating to: compute a centralized guard time (GTe) between two neighboring allocation intervals or between a beacon transmission interval and a neighboring allocation interval, the centralized guard time accounting for clock drift during a nominal synchronization interval; compute a minimum guard time (GTo), the minimum guard time accounting for a receive-to-transmit or transmit-to-receive turnaround time, and a synchronization error tolerance; provision a guard time interval between two neighboring allocation intervals or between a beacon transmission interval and a neighboring allocation interval, the guard time interval being at least as long as the centralized guard time; and transmit one or more frames between the devices within the allocation intervals.

18. The device of claim 17, wherein the minimum guard time further accounts for a timing uncertainty.

19. The device of claim 18, the processor further operating to: commence reception of a beacon by the device up to GT,–GTo earlier than a nominal start of the beacon to account for clock drifts since the device last synchronized with an other device.

20. The device of claim 18, the processor further operating to: commence reception up to GT,–GTo earlier or later than a nominal start of the device's next scheduled downlink or bilink allocation interval to account for clock drifts since a last synchronization.

21. The device of claim 18, the processor further operating to: commence reception up to GT,–GTo earlier than a nominal start of the device's next poll or post to account for clock drift, where a last synchronization interval is measured up to a nominal start of the poll or post.

22. The device of claim 18, the processor further operating to: commence transmission at a nominal start of the device's next scheduled uplink or polled allocation interval, and ending transmission in the device's next scheduled uplink or polled allocation interval such that a last transmission in the device's next scheduled uplink or polled allocation interval completes by a nominal end of the device's next scheduled uplink or polled allocation interval.

23. The device of claim 17, the processor further operating to: commence reception of a beacon by the device up to GT,–GTo earlier than a nominal start of the beacon to account for clock drifts since the device last synchronized with an other device.

24. The device of claim 17, the processor further operating to: commence reception up to GT,–GTo earlier or later than a nominal start of the device's next scheduled downlink or bilink allocation interval to account for clock drifts since a last synchronization.

25. The device of claim 17, the processor further operating to: commence reception up to GT,–GTo earlier than a nominal start of the device's next poll or post to account for clock drift, where a last synchronization interval is measured up to a nominal start of the poll or post.

26. The device of claim 17, the processor further operating to: commence transmission at a nominal start of the device's next scheduled uplink or polled allocation interval, and ending transmission in the device's next scheduled uplink or polled allocation interval such that a last transmission in the device's next scheduled uplink or polled allocation interval completes by a nominal end of the device's next scheduled uplink or polled allocation interval.

* * * * *